United States Patent
Dong et al.

(10) Patent No.: US 9,810,072 B2
(45) Date of Patent: Nov. 7, 2017

(54) ROTOR BLADE COOLING

(71) Applicant: General Electric Company, Schenectady, NY (US)

(72) Inventors: Zhirui Dong, Simpsonville, SC (US); Xiuzhang James Zhang, Simpsonville, SC (US); Jason Adam Neville, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 567 days.

(21) Appl. No.: 14/288,748

(22) Filed: May 28, 2014

(65) Prior Publication Data

US 2015/0345303 A1    Dec. 3, 2015

(51) Int. Cl.
*F01D 5/18* (2006.01)
*F01D 5/08* (2006.01)

(52) U.S. Cl.
CPC .............. *F01D 5/186* (2013.01); *F01D 5/187* (2013.01); *F01D 5/085* (2013.01); *F05D 2260/202* (2013.01); *F05D 2260/2212* (2013.01); *Y02T 50/676* (2013.01)

(58) Field of Classification Search
CPC . F01D 5/18; F01D 5/186; F01D 5/188; F01D 5/189; F01D 5/187; F05D 2240/304; F05D 2260/2212; F05D 2260/2214; F05D 2260/22141; F05D 2250/185; F05D 2240/307; Y02T 50/676
See application file for complete search history.

(56) References Cited

U.S. PATENT DOCUMENTS

| | | | | |
|---|---|---|---|---|
| 3,801,218 A | * | 4/1974 | Moore | F01D 5/186 416/95 |
| 4,684,322 A | * | 8/1987 | Clifford | F01D 5/187 415/175 |
| 4,753,575 A | * | 6/1988 | Levengood | F01D 5/187 415/115 |
| 5,387,085 A | * | 2/1995 | Thomas, Jr. | F01D 5/187 415/115 |
| 5,387,086 A | | 2/1995 | Frey et al. | |

(Continued)

FOREIGN PATENT DOCUMENTS

| | | |
|---|---|---|
| EP | 0716217 B1 | 6/1996 |
| EP | 1122405 B1 | 8/2001 |
| EP | 1205634 A2 | 5/2002 |

*Primary Examiner* — Pascal M Bui Pho
*Assistant Examiner* — Alain Chau
(74) *Attorney, Agent, or Firm* — Dority & Manning, PA (57) ABSTRACT

A rotor blade includes a mounting portion comprising a mounting body that is formed to receive a coolant therein. An airfoil portion extends substantially radially outwardly from the mounting body and includes an airfoil body. The mounting body and the airfoil body define a plurality of primary cooling passages that extend substantially radially therein for routing the coolant through the airfoil body. Each of the primary cooling passages includes a cooling flow outlet that is formed along a tip portion of the airfoil body. The airfoil body further defines a plurality of trailing edge cooling passages, each having a coolant outlet that is formed along a trailing edge portion of the airfoil body. At least a portion of the trailing edge cooling passages are formed along a radially outer portion of the trailing edge proximate to the tip portion of the airfoil body.

8 Claims, 5 Drawing Sheets

(56) References Cited

U.S. PATENT DOCUMENTS

| | | | | |
|---|---|---|---|---|
| 5,902,093 A * | 5/1999 | Liotta | ...................... | F01D 5/20 |
| | | | | 415/115 |
| 6,168,381 B1 * | 1/2001 | Reddy | .................... | F01D 5/186 |
| | | | | 415/116 |
| 6,485,262 B1 | 11/2002 | Heyward et al. | | |
| 6,506,022 B2 | 1/2003 | Bunker | | |
| 6,554,572 B2 | 4/2003 | Rinck et al. | | |
| 6,561,758 B2 | 5/2003 | Rinck et al. | | |
| 6,595,748 B2 * | 7/2003 | Flodman | ................ | F01D 5/186 |
| | | | | 415/115 |
| 6,824,360 B2 * | 11/2004 | Fleck | ..................... | F01D 5/187 |
| | | | | 415/115 |
| 6,988,872 B2 * | 1/2006 | Soechting | ............... | F01D 5/186 |
| | | | | 415/115 |
| 7,147,440 B2 | 12/2006 | Benjamin et al. | | |
| 7,165,940 B2 | 1/2007 | McGrath et al. | | |
| 7,186,082 B2 * | 3/2007 | Mongillo, Jr. | .......... | F01D 5/187 |
| | | | | 416/1 |
| 7,670,113 B1 * | 3/2010 | Liang | ..................... | F01D 5/081 |
| | | | | 416/96 R |
| 8,491,264 B1 * | 7/2013 | Liang | ..................... | F01D 5/187 |
| | | | | 416/97 R |
| 8,753,083 B2 * | 6/2014 | Lacy | ...................... | F01D 5/186 |
| | | | | 415/115 |
| 2009/0155088 A1 * | 6/2009 | Lee | ......................... | F01D 5/188 |
| | | | | 416/90 R |
| 2009/0185903 A1 * | 7/2009 | Beeck | .................... | F01D 5/145 |
| | | | | 416/91 |
| 2010/0226789 A1 * | 9/2010 | Liang | ..................... | F01D 5/186 |
| | | | | 416/97 R |
| 2011/0250078 A1 * | 10/2011 | Bruce | .................... | F01D 5/085 |
| | | | | 416/96 R |
| 2013/0272850 A1 * | 10/2013 | Bunker | ................... | F01D 5/147 |
| | | | | 415/116 |
| 2014/0093388 A1 * | 4/2014 | Pointon | .................. | F01D 5/186 |
| | | | | 416/97 R |
| 2014/0169962 A1 * | 6/2014 | Lee | ......................... | F01D 5/186 |
| | | | | 416/1 |
| 2014/0271131 A1 * | 9/2014 | Moody | ................... | F01D 5/186 |
| | | | | 415/116 |

* cited by examiner

ROTOR BLADE COOLING

FIELD OF THE INVENTION

The present invention generally relates to a rotor blade for a turbine. More particularly, this invention involves cooling the rotor blade.

BACKGROUND OF THE INVENTION

A gas turbine includes a compressor, a combustor and a turbine. A working fluid (e.g., air) flows into the compressor where it is progressively compressed as it is routed towards the combustor. At least a portion of the compressed working fluid is mixed with a fuel such as natural gas to provide a combustible mixture to a combustion chamber defined within the combustor where it is burned to generate combustion gases having a high temperature and pressure. The combustion gases are routed into the turbine. Thermal and kinetic energy is transferred from the combustion gases to successive stages of rotor blades that are coupled to a rotor shaft, thereby causing the shaft to rotate and produce work. For example, the shaft may drive a generator to produce electricity.

Rotor blades typically include a mounting portion and an airfoil portion that extends radially outwardly from the mounting portion. The mounting portion may include a dovetail feature for securing the rotor blade to the rotor shaft. The airfoil portion generally includes an airfoil body which defines a leading edge, a trialing edge, a pressure side and a suction side where the pressure and suction sides intersect at the leading and trailing edges. The leading edge generally faces towards the flow of combustion gases and the pressure side is configured to receive the combustion gases and extract kinetic energy therefrom.

High combustion gas temperatures within the turbine section generally corresponds to greater thermal and kinetic energy transfer between the combustion gases and the rotor blades, thereby enhancing overall power output of the gas turbine. However, overtime high combustion gas temperatures may lead to erosion, creep, and/or low cycle fatigue to the rotor blades, particularly at a radially outward portion of the trailing edge of the airfoil body, thereby potentially limiting durability of the rotor blades. Therefore, continued improvements in rotor blade cooling are useful.

BRIEF DESCRIPTION OF THE INVENTION

Aspects and advantages of the invention are set forth below in the following description, or may be obvious from the description, or may be learned through practice of the invention.

One embodiment of the present invention is a rotor blade. The rotor blade includes a mounting portion that is interconnectable with a rotor of a turbine. The mounting portion has a mounting body that is formed to receive coolant therein. An airfoil portion of the rotor blade extends substantially radially outwardly from a radially outward portion of the mounting body and includes an airfoil body. The airfoil body defines a plurality of primary cooling passages that extend substantially radially therein for routing the coolant from the mounting body through the airfoil body. Each of the primary cooling passages comprises a cooling flow outlet that is disposed along a tip portion of the airfoil body. The airfoil body further defines a plurality of trailing edge cooling passages. Each trailing edge cooling passage terminates at a coolant outlet that is formed along a trailing edge portion of the airfoil body. At least a portion of the trailing edge cooling passages are formed along a radially outer portion of the trailing edge proximate to the tip portion of the airfoil body. Each trialing edge cooling passage is in fluid communication with at least one of the primary cooling passages. In particular embodiments, each of the primary cooling passages are fluidly isolated from adjacent primary cooling passages.

Another embodiment of the present invention is rotor blade. The rotor blade includes a mounting portion which comprises a mounting body that is interconnectable with a rotor of a turbine. The mounting body is formed to receive coolant therein. A platform is formed at a radially outer portion of the mounting body and an airfoil portion extends radially outwardly from the platform. The airfoil portion comprises an airfoil body which defines a primary cooling passage that extends substantially radially therein for routing the coolant from the mounting body through the airfoil body. The primary cooling passage includes a cooling flow outlet that is disposed along a tip portion of the airfoil body for routing the coolant out of the primary cooling passage. The airfoil body further defines a plurality of trailing edge cooling passages. Each trailing edge cooling passage includes a coolant outlet that is formed along a trailing edge portion of the airfoil body. A portion of the trailing edge cooling passages are defined along a radially outer portion of the trailing edge that is proximate to the tip of the airfoil body. Each trailing edge cooling passage is in fluid communication with the primary cooling passage.

Another embodiment of the present invention is a gas turbine. The gas turbine includes a compressor, a combustor that is downstream from the compressor and a turbine that is downstream from the combustor. A rotor shaft extends at least partially through the turbine. A rotor blade is interconnected to the rotor shaft via a mounting portion of the rotor blade. The mounting portion includes a mounting body that is formed to receive a coolant from the coolant supply. The rotor blade comprises a platform that is disposed at a radially outer portion of the mounting body. An airfoil portion comprises an airfoil body that extends substantially radially outwardly from the platform. The airfoil body defines a plurality of primary cooling passages that extend substantially radially therein for routing the coolant from the mounting body through the airfoil body. Each of the primary cooling passages comprises a cooling flow outlet that is formed along a tip portion of the airfoil body so as to exhaust a portion of the coolant therethrough. The airfoil body further defines a plurality of trailing edge cooling passages. Each trailing edge includes a coolant outlet that is formed along a trailing edge portion of the airfoil body. At least one of the trialing edge cooling passages is in fluid communication with at least one of the primary cooling passages.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although an industrial or land based gas turbine is shown and described herein, the present invention as shown and described herein is not limited to a land based and/or industrial gas turbine unless otherwise specified in the claims. For example, the invention as described herein may be used in any type of turbine including but not limited to a steam turbine, an aircraft gas turbine or marine gas turbine.

Figure 1:
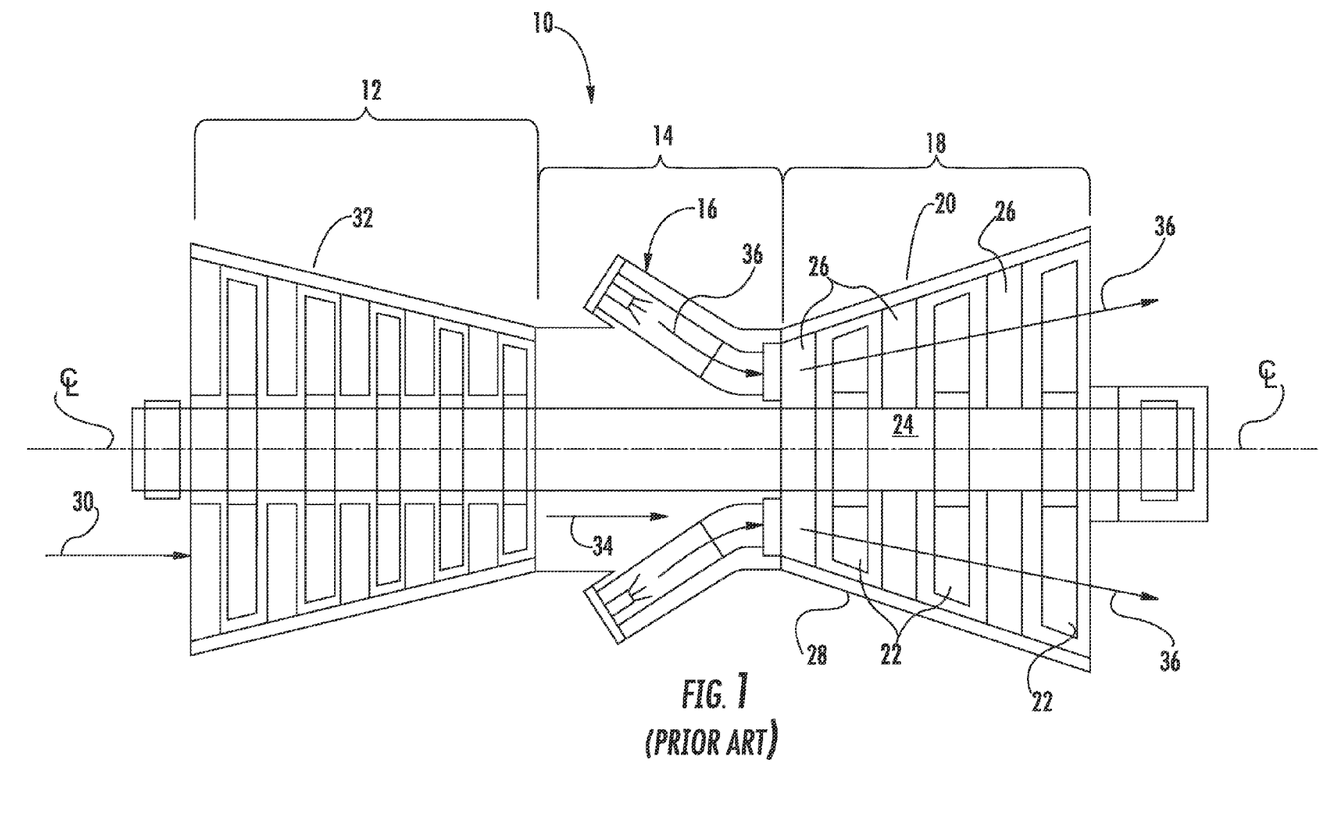
FIG. 1 illustrates a functional diagram of an exemplary gas turbine as may incorporate at least one embodiment of the present invention.

Referring now to the drawings, wherein like numerals refer to like components, FIG. 1 illustrates an example of a gas turbine 10 as may incorporate various embodiments of the present invention. As shown, the gas turbine 10 includes a compressor section 12, a combustion section 14 having one or more combustors 16 that are disposed downstream from the compressor section 12, and a turbine section 18 including a turbine 20 that is disposed downstream from the combustion section 14. The turbine 20 generally includes multiple rows or stages of rotor blades 22 that are interconnected or coupled to a rotor shaft 24. Sequential rows of stationary vanes 26 are disposed within the turbine 20 between sequential rows of the rotor blades 20. A casing 28 surrounds the rows of stationary vanes and turbine blades to at least partially define a hot gas path through the turbine 20.

In operation, a working fluid 30 such as air enters a compressor 32 of the compressor section 12. The working fluid 30 is progressively compressed as it routed through the compressor 32 towards the combustor(s) 16 of the combustion section 14 to provide a compressed working fluid 34 to the combustor(s) 16. Fuel is mixed with the compressed working fluid 34 within each combustor 16 and the mixture is burned to produce combustion gases 36 at a high temperature and a high velocity. The combustion gases 36 are routed from the combustor(s) 16 across a first row of the stationary vanes 26 and into the turbine 20. Thermal and/or kinetic energy is extracted from the combustion gases 36 via the rotor blades 22, thereby causing the rotor shaft 24 to rotate.

Figure 2:
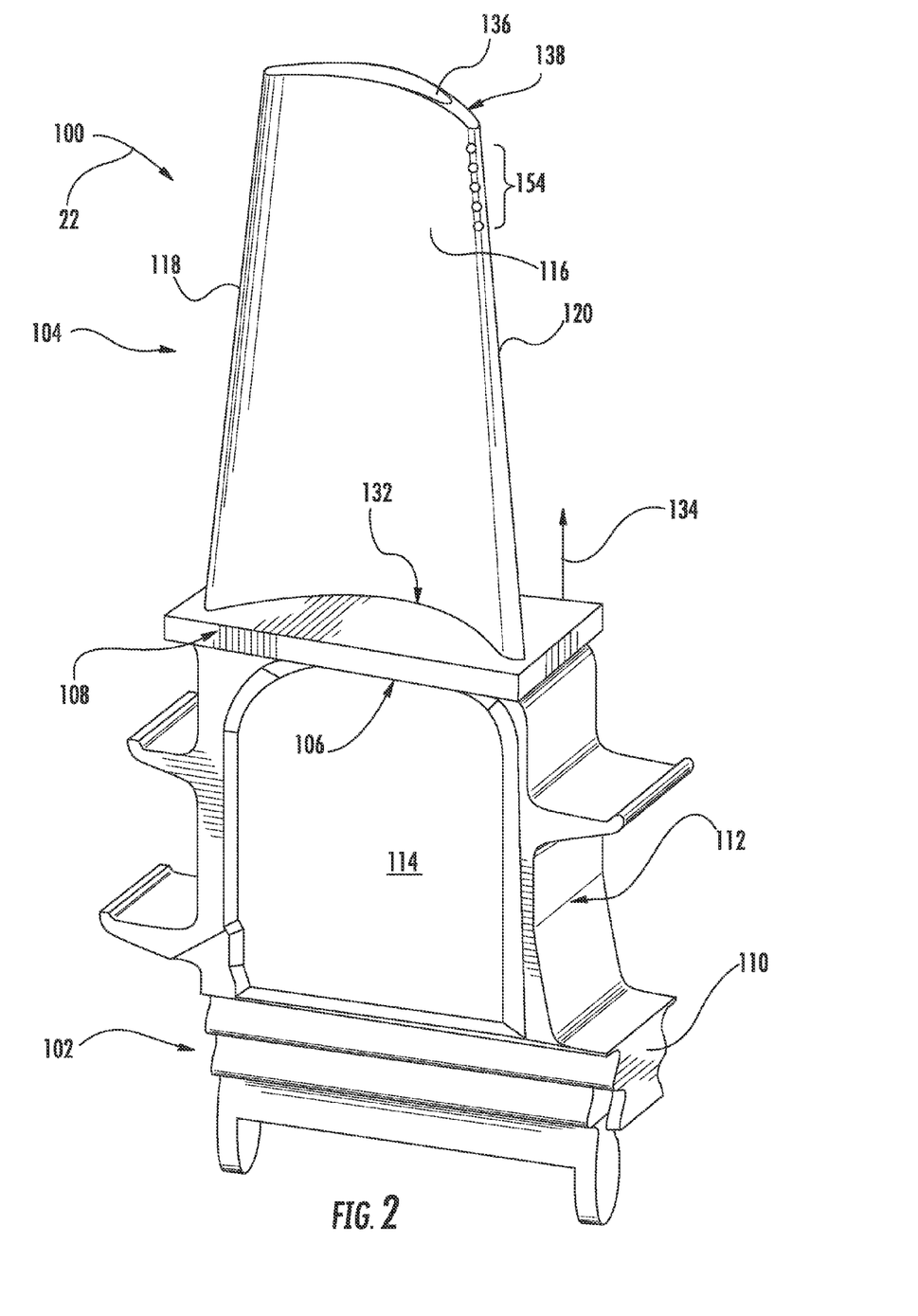
FIG. 2 is a perspective view of an exemplary rotor blade as may incorporate various embodiments of the present disclosure.

FIG. 2 provides a perspective view of an exemplary rotor blade 100 as may incorporate various embodiments of the present disclosure and that is intended to take the place of the rotor blade 22 shown in FIG. 1. As shown in FIG. 2, the rotor blade 100 generally comprises a mounting portion 102, an airfoil portion 104 that extends radially outwardly from a radially outer portion 106 of the mounting portion 102. In one embodiment, the rotor blade 100 includes a platform portion 108 that is formed between the mounting portion 102 and the airfoil portion 104.

In one embodiment, the mounting portion 102 comprises a mounting body 110. The mounting body 110 is formed to interconnect or secure the rotor blade to the rotor shaft 24 (FIG. 1) For example, as shown in FIG. 2, a portion of the mounting body 110 may have a fir-tree or dovetail profile that is complementary to a fir-tree or dovetailed slot (not shown) formed on the rotor shaft 24. In one embodiment, the mounting body 110 may include or define a shank portion 112 of the rotor blade 100. In this embodiment, the shank portion 112 may include and/or define a pocket 114 for receiving a coolant such as a portion of the compressed working fluid 34 provided by the compressor 32 (FIG. 1).

Figure 3:
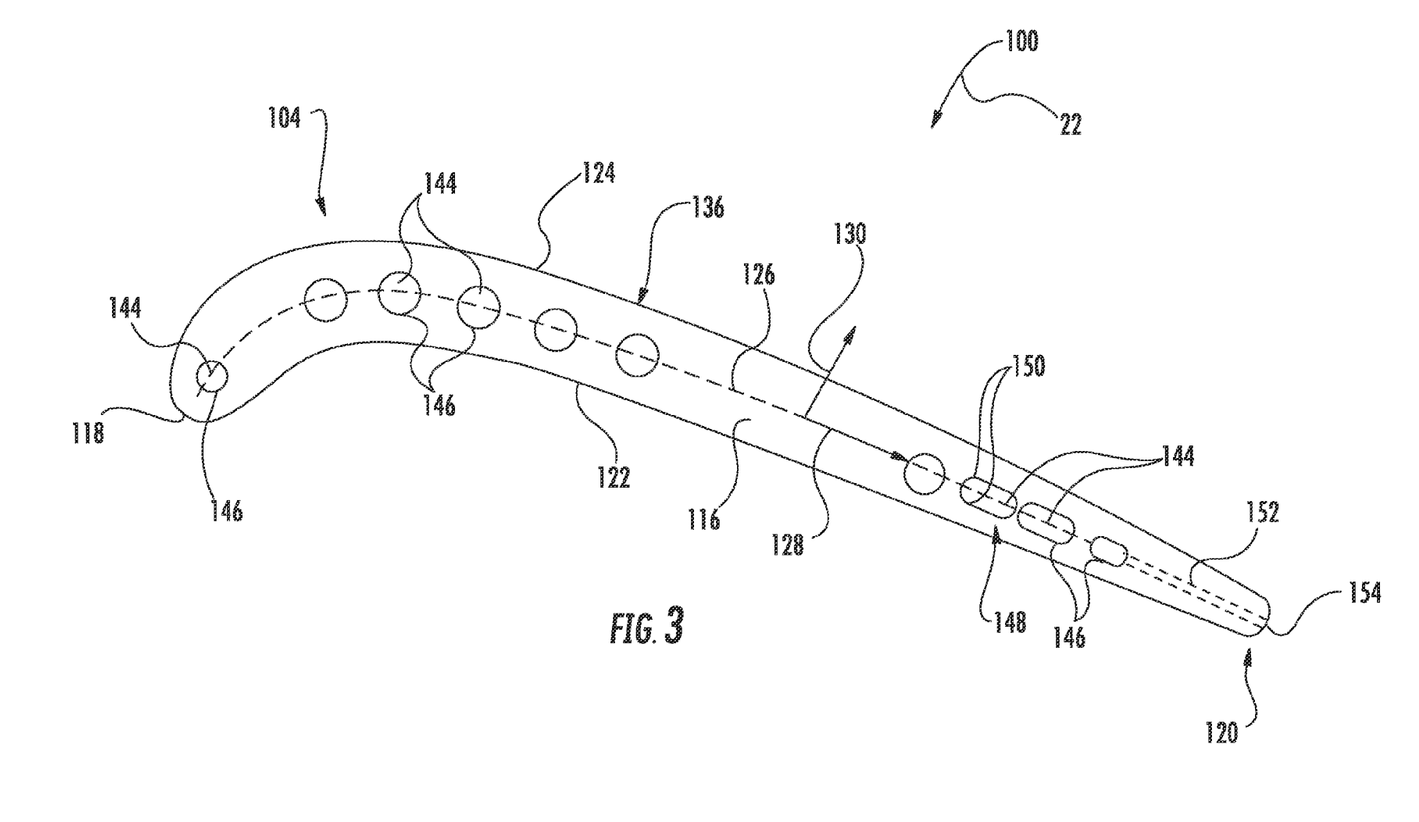
FIG. 3 is a top view of the exemplary rotor blade as shown in FIG. 2, according to one embodiment of the invention.

FIG. 3 provides a top view of the exemplary rotor blade 100 as shown in FIG. 2, according to one embodiment of the invention. As shown in FIGS. 2 and 3, the airfoil portion 104 generally includes an airfoil body 116. The airfoil body 116 defines a leading edge 118 and a trailing edge 120. As shown in FIG. 3, the airfoil body 116 defines a pressure side 122 and an opposing suction side 124. The leading edge 118, trailing edge 120, the pressure side 122 and the suction side 124 cooperatively define a camber line 126. The camber line 126 defines a major axis 128 and a minor axis 130, which is perpendicular to the major axis 128.

As shown in FIG. 2, the airfoil body 116 includes a root portion 132 that is defined at an intersection with the mounting portion 102 and/or the platform 108. As shown, the airfoil body 116 extends in a radial direction 134 or radially outwardly from the platform 108 and/or the mounting portion 102. It should be understood that the airfoil body 116 may extend in a substantially radial direction with respect to the platform 108 and/or the mounting portion 102, thus variations from the radial direction 134 are contemplated herein. As shown in FIGS. 2 and 3, the airfoil body 116 also includes a tip portion 136 formed at a radially distal end 138 (FIG. 2) of the airfoil body 116.

Figure 4:
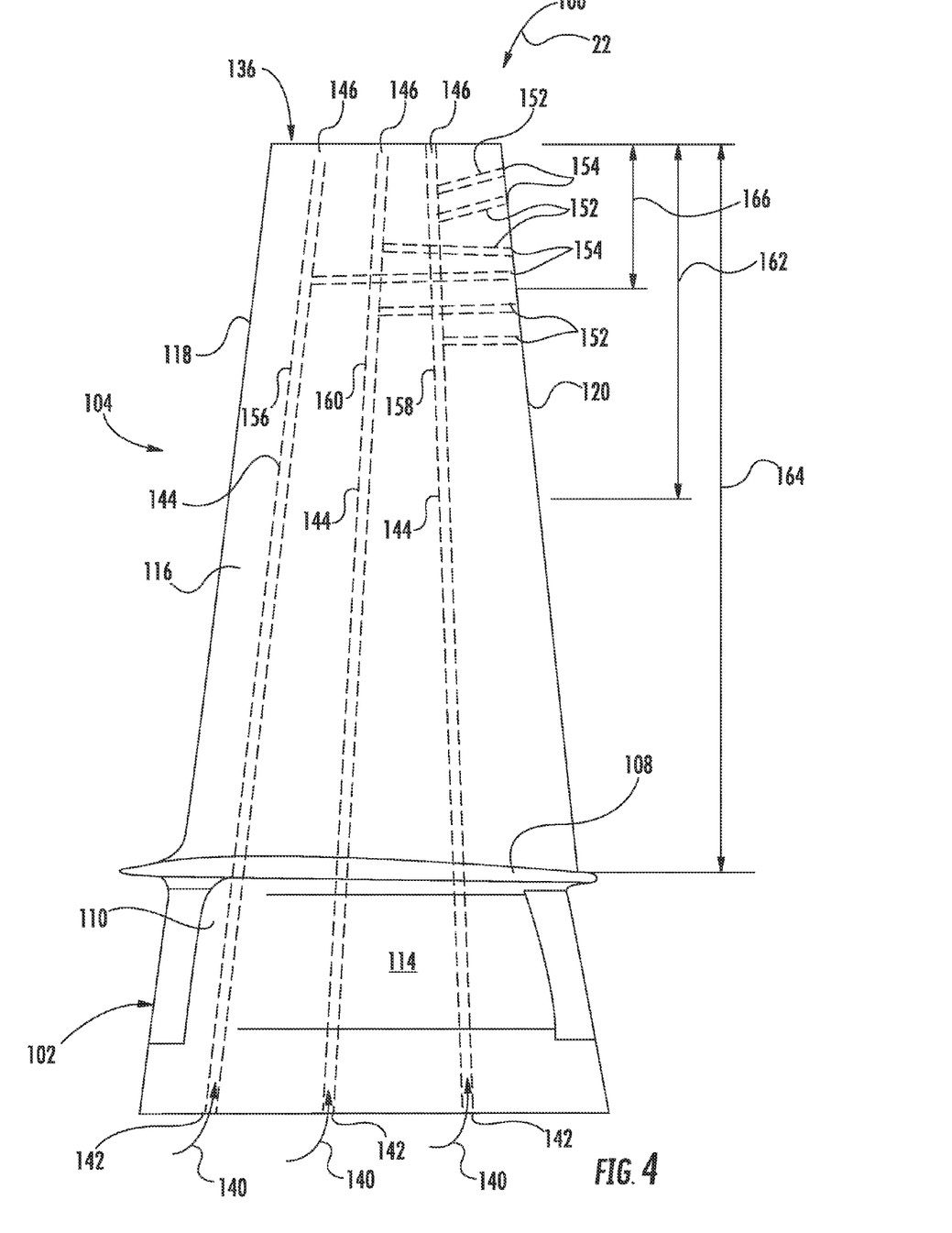
FIG. 4 is a side view of the rotor blades as shown in FIGS. 2 and 3, according to various embodiments of the present invention.

FIG. 4 is a side view of the rotor blade 100, according to various embodiments of the present invention. As shown in FIG. 4, the mounting body 110 is configured to receive a coolant 140 from a coolant supply. For example, the coolant 140 may include a portion of the compressed working fluid 34 (FIG. 1) from the compressor 32 or steam from an alternate coolant supply source. As shown in FIG. 4, one or more cooling passage inlets 142 may be formed along the mounting body 110 and are in fluid communication with the coolant supply. In one embodiment, at least one of the cooling passage inlets 142 may be formed along the pocket 114.

In various embodiments, as shown in FIG. 4, the mounting body 110 and the airfoil body 116 define at least one primary cooling passage 144 that extends substantially radially therein. In one embodiment, the mounting body 110 and the airfoil body 116 define a plurality of cooling passages 144 that extend substantially radially therein. Here, each primary cooling passage 144 is formed within the mounting body 110 and the airfoil body 116 to be solely and independently receptive of the coolant 140 received from the cooling passage inlets 140. In other words, where multiple primary cooling passages 144 are defined, the primary cooling passages 144 are fluidly isolated from one another or do not fluidly communicate.

In one embodiment, as shown in FIGS. 3 and 4, each primary cooling passage 144 comprises a cooling flow outlet 146 disposed along the tip portion 136 of the airfoil body. In this manner, the primary cooling passages 144 provides for fluid communication of the coolant 140 from the cooling passage inlet(s) 142, through the mounting body 110, the airfoil body 116 and out of the tip portion 136, thus cooling the airfoil body 116.

In one embodiment, the primary cooling passage 144 may be defined as having a substantially non-circular cross-sectional shape 148 at any one or more predefined radial positions of the airfoil body 116. This non-circular shape 144 allows for an increased perimeter and larger cross-sectional area of the primary cooling passage 144 and leads to a greater degree of heat transfer without a thickness of the airfoil body 116 having to be sacrificed beyond a thickness that is required to maintain manufacturability and structural integrity.

Where the primary cooling passage 144 is non-circular, the primary cooling passage 144 may have various alternative shapes including, but not limited to, elliptical or otherwise elongated shapes. The primary cooling passage 144 may be rounded or angled, regular or irregular. The primary cooling passage 144 may be symmetric about a predefined axis or non-symmetric about any predefined axis. As shown in FIG. 3, the primary cooling passage 144 may be defined with elongated sidewalls 150 that have profiles mimicking local profiles of the pressure and suction sides 122, 124 such that the wall 150 is elongated with a thickness that is equal to or greater than a wall thickness required for the maintenance of manufacturability and structural integrity. Similarly, the primary cooling passage 144 may be longer in an axial direction of the airfoil body 116 or along the major axis than a circumferential direction thereof and/or may have an aspect ratio that is less than or greater than 1, non-inclusively, with respect to the camber line 126.

The substantial non-circularity of the primary cooling passage 144 may be localized, may extend along a partial radial length of the primary cooling passage 144 or may extend along an entire radial length of the primary cooling passage 144. In this manner, the increased heat transfer facilitated by the substantial non-circularity of the primary cooling passage 144 may be provided to only a portion of the length of the airfoil body 116 or to a portion along the entire length of the airfoil body 116.

In various embodiments, as shown in FIGS. 3 and 4, the rotor blade 100 includes at least one trailing edge cooling passage 152 defined within the airfoil body 116. In particular embodiments the rotor blade 100 includes a plurality of trailing edge cooling passages 152. As shown in FIGS. 2, 3 and 4, each trailing edge cooling passage 152 terminates at a coolant outlet 154 that is formed along the trailing edge 120 of the airfoil body 116.

As shown in FIG. 4, each trailing edge cooling passage 152 is in fluid communication with at least one of the primary cooling passages 144. In one embodiment, the primary cooling passages 144 comprise a forward primary cooling passage 156 formed proximate to the leading edge 118, an aft primary cooling passage 158 formed proximate to the trailing edge 120 and an intermediate primary cooling passage 160 defined between the forward and aft primary cooling passages 156, 158 within the airfoil body 116. In one embodiment, at least one of the trailing edge cooling passages 152 is in fluid communication with the aft primary cooling passage 158. In one embodiment, at least one of the trailing edge cooling passages 152 is in fluid communication with the forward primary cooling passage 156. In one embodiment, at least one of the trailing edge cooling passages 152 is in fluid communication with the intermediate primary cooling passage 160.

In one embodiment, as shown in FIG. 4, at least a portion of the trailing edge cooling passages 152 are formed along a radially upper or outer portion of the trailing edge 120 proximate to the tip portion 136 of the airfoil body 116. For example, in one embodiment at least a portion of the trailing edge cooling passages 152 are formed along an upper half 162 of the airfoil body 116 with respect to a total radial height 164 of the rotor blade 100 as measured from the platform portion 108. In one embodiment, at least a portion of the trailing edge cooling passages 152 are formed along an upper quarter 166 of the airfoil body 116 with respect to the total radial height 164 of the airfoil body 116.

Figures 5, 6, 7:
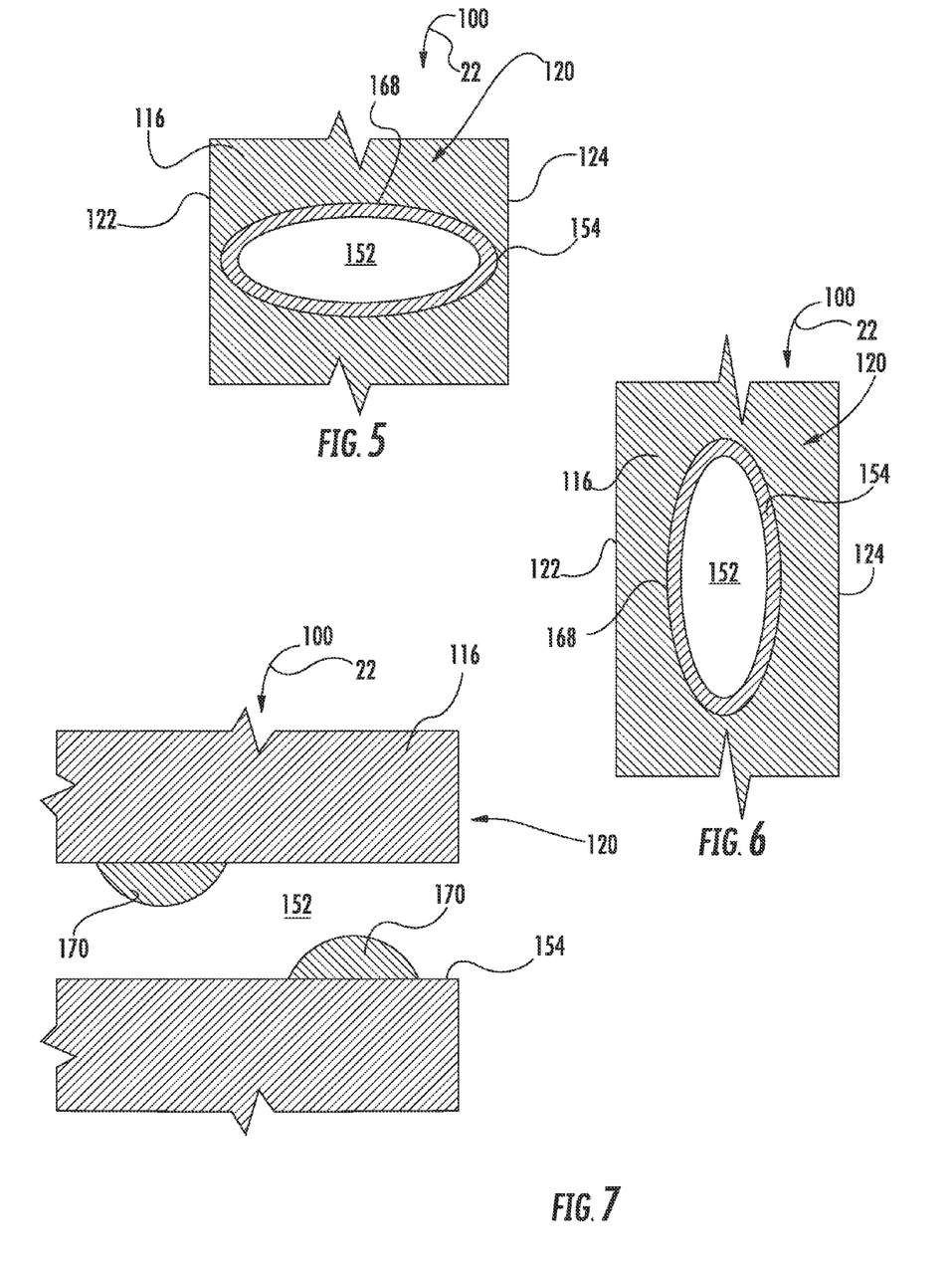
FIG. 5 is a cross-sectional axial view of an exemplary trailing edge cooling passage according to one embodiment of the present invention.
FIG. 6 is a cross-sectional axial view of an exemplary trailing edge cooling passage according to one embodiment of the present invention.
FIG. 7 is a cross-sectional side view of an exemplary trailing edge cooling passage according to one embodiment of the present invention.

FIGS. 5 and 6 provide a cross-sectional axial view of an exemplary trailing edge cooling passage 152 looking along the major axis 128 of the airfoil body 116 according to one embodiment of the present invention. In one embodiment, at least one of the trialing edge cooling passages 152 may be defined as having a substantially non-circular cross-sectional shape 168 at any one or more predefined axial positions of the airfoil body 116 with respect to an axial centerline of the airfoil body 116 or the camber line 126 and/or the major axis 128. This non-circular shape 168 allows for an increased perimeter and larger cross-sectional area of the trailing edge cooling passage 152 and leads to a greater degree of heat transfer without a thickness of the airfoil body 116 having to be sacrificed beyond a thickness that is required to maintain manufacturability and structural integrity.

Where the trailing edge cooling passage 152 is non-circular, the trailing edge cooling passage 152 may have various alternative shapes including, but not limited to, elliptical or otherwise elongated shapes. The trailing edge cooling passage 152 may be rounded or angled, regular or irregular. The trailing edge cooling passage 152 may be symmetric about a predefined axis or non-symmetric about any predefined axis. The trailing edge cooling passage 152 may be defined with arcuate sidewalls 150 that extend across the trialing edge 120 between the pressure and suction sides 122, 124 of the airfoil body as shown in FIG. 5. In one embodiment, as shown in FIG. 6, the trailing edge cooling passage 152 may be defined with arcuate sidewalls 150 that extend across the trialing edge 120 in the directions of the root and tip portions 132, 136 of the airfoil body 116. The substantial non-circularity of the trailing edge cooling passage 152 may be localized, may extend along a partial axial or major axis length of the trailing edge cooling passage 152 or may extend along an entire axial or major axis length of the trailing edge cooling passage 152.

FIG. 7 provides a cross-sectional side view of an exemplary trailing edge cooling passage 152 according to one embodiment of the present invention. As shown in FIG. 7, a turbulator 170 or flow feature is formed or positioned within the trailing edge cooling passage 152. In particular embodiments where there is a plurality of the trailing edge cooling passages 152, at least some of the trailing edge cooling passages 152 includes a turbulator 170 or flow feature. The turbulator 170 allows the trailing edge cooling passage 152 to have a substantially non-circular cross-sectional shape at a predefined axial position or position along the major axis 128 of the airfoil body 116 and a substantially circular cross-sectional shape at another predefined axial position or position along the major axis 128 of the airfoil body 116.

The turbulator 170 and, more generally, the turbulated section of the trailing edge cooling passage 152 where the turbulator 170 is located may act to increase the heat transfer in the airfoil body 116. The turbulation acts to trip the flow of coolant 140 through the trailing edge cooling passage 152, which results in a boundary restart layer with an increased localized heat transfer coefficient. The turbulation can be along the entire perimeter of the trailing edge cooling passage 152, or at partial sections and may allow for part life of the airfoil body 116 to be lengthened and a required amount of cooling flow to be decreased. The turbulator 170 may be formed by various processes, such as electro-chemical machining (ECM), laser cutting and/or additive manufacturing processes.

The turbulator 170 may be a single component within the trailing edge cooling passage 152 or may be plural in number. Where the turbulator 170 is plural in number, a series of turbulators 170 may be arrayed in an axial direction along a length of the trailing edge cooling passage 152.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A rotor blade, comprising:
    a root portion;
    an airfoil portion extending radially outwardly from the root portion, the airfoil portion having a leading edge and a trailing edge, wherein the airfoil terminates radially at a tip portion;
    a forward primary cooling passage defined within the rotor blade and having a first inlet disposed along the root portion and a first outlet disposed along the tip portion to permit a coolant to exit the airfoil portion through the tip portion, wherein the forward primary cooling passage is in fluid communication with a first trailing edge cooling passage disposed along the trailing edge of the airfoil portion;
    an intermediate primary cooling passage defined within the rotor blade and having a second inlet disposed along the root portion and a second outlet disposed along the tip portion to permit the coolant to exit the airfoil portion through the tip portion, wherein the intermediate primary cooling passage is in fluid communication with a second trailing edge cooling passage disposed along the trailing edge of the airfoil portion;
    an aft primary cooling passage defined within the rotor blade and having a third inlet disposed along the root portion and a third outlet disposed along the tip portion to permit the coolant to exit the airfoil portion through the tip portion, wherein the aft primary cooling passage is in fluid communication with a third trailing edge cooling passage disposed along the trailing edge of the airfoil portion; and
    wherein the forward primary cooling passage, the intermediate primary cooling passage and the aft primary cooling passage are fluidly isolated from each other within the rotor blade.

2. The rotor blade as in claim 1, wherein the first trailing edge cooling passage is disposed along an upper quarter of the airfoil portion with respect to a radial height of the airfoil portion.

3. The rotor blade as in claim 1, wherein the second trailing edge cooling passage is disposed along an upper quarter of the airfoil portion with respect to a radial height of the airfoil portion.

4. The rotor blade as in claim 1, wherein the third trailing edge cooling passage is disposed along an upper quarter of the airfoil portion with respect to a radial height of the airfoil portion.

5. The rotor blade as in claim 1, wherein at least one of the first, second or third trailing edge cooling passages has a non-circular cross-sectional shape at a pre-defined axial position of the airfoil body.

6. The rotor blade as in claim 1, wherein at least one of the first, second or third trailing edge cooling passages is defined as having a substantially non-circular cross-sectional shape at a predefined axial position of the airfoil body and a substantially circular cross-sectional shape at another predefined axial position of the airfoil body.

7. The rotor blade as in claim 1, wherein at least one of the first, second or third trailing edge cooling passages includes a turbulator defined therein.

8. The rotor blade as in claim 1, wherein at least one of the forward, intermediate or aft primary cooling passages is defined as having a substantially non-circular cross-sectional shape at a predefined radial position of the airfoil body and a substantially circular cross-sectional shape at another predefined radial position of the airfoil body.

* * * * *